United States Patent [19]

Van der Veen et al.

[11] Patent Number: 5,365,247
[45] Date of Patent: Nov. 15, 1994

[54] TRANSMITTERS AND RECEIVERS WITH ANTENNAS

[75] Inventors: Albertus C. Van der Veen, Kent; Graham K. L. Smith, Hampshire, both of England

[73] Assignee: 501 Hi-Trak Systems Limited, Surrey, England

[21] Appl. No.: 945,421

[22] Filed: Sep. 14, 1992

Related U.S. Application Data

[63] Continuation of Ser. No. 590,264, Sep. 28, 1990, abandoned.

[30] Foreign Application Priority Data

Sep. 30, 1989 [GB] United Kingdom ............ 8922095

[51] Int. Cl.$^5$ .............................................. H01Q 1/24
[52] U.S. Cl. ................................ 343/702; 343/745; 343/900
[58] Field of Search ............ 343/702, 895, 900, 715, 343/749, 752, 722, 850, 745; H01Q 1/36, 1/24, 1/32

[56] References Cited

U.S. PATENT DOCUMENTS

| | | | |
|---|---|---|---|
| 3,176,229 | 3/1965 | Pierce | 325/105 |
| 3,513,472 | 5/1970 | Altmayer | 343/900 |
| 3,978,410 | 8/1976 | Fletcher et al. | 325/114 |
| 4,491,843 | 1/1985 | Boubouleix | 343/702 |
| 4,543,581 | 9/1985 | Nemet | 343/702 |
| 4,564,843 | 1/1986 | Cooper | 343/745 |
| 4,612,667 | 9/1986 | Hansen | 455/98 |

FOREIGN PATENT DOCUMENTS

| | | | |
|---|---|---|---|
| 222563 | 2/1985 | Japan | H01Q 1/24 |
| 63-284908 | 11/1988 | Japan | H01Q 1/36 |
| 63-284910 | 11/1988 | Japan | H01Q 1/36 |
| 922229 | 3/1963 | United Kingdom . | |
| 1033496 | 6/1966 | United Kingdom . | |
| 1143098 | 2/1969 | United Kingdom . | |
| 1471528 | 4/1977 | United Kingdom . | |
| 2046529 | 11/1980 | United Kingdom . | |
| 2141878 | 1/1985 | United Kingdom | 343/702 |

*Primary Examiner*—Donald Hajec
*Assistant Examiner*—Hoanganh Le
*Attorney, Agent, or Firm*—Stroock & Stroock & Lavan

[57] ABSTRACT

The invention concerns a combination of a transmitter/receiver (12, 13) having a predetermined frequency/wavelength and an antenna (15), the antenna comprising a coiled wire portion (16) one end of which is connected to the output (14) of the transmitter/receiver and a straight wire portion (17) one end of which is connected in series to the other end of the coiled wire portion, the combined length of the portions being no more than one quarter wavelength, the inductive reactance of the coiled wire portion (16) being selected to both substantially tune out the capacitive reactance of the transmitter (12, 13) and the capacitive reactance of the straight wire portion so that the overall impedance of the system is predominantly resistive, and at least the majority of the coiled portion (16) being external to the conductive portion (12) of the transmitter so as to effectively add to the electrical length of at least the straight portion (17) and itself act as a radiator. The system is particularly designed to be used with no ground plane or only a partial ground plane and with the antenna length less than quarter wavelength. This is particularly useful in the sport of falconry. The system of the invention gives a higher output than a conventional quarter wavelength straight antenna with no ground plane.

18 Claims, 3 Drawing Sheets

TRANSMITTERS AND RECEIVERS WITH ANTENNAS

This is a continuation of application Ser. No. 07/590,264, filed Sep. 28, 1990, now abandoned.

BACKGROUND OF THE INVENTION

This invention relates to antennas combined with transmitters and/or receivers and particularly, but not essentially, to small, low voltage, substantially single frequency, transmitters/receivers and antennas which may have to be used without a good ground plane.

In the design of transmitters which are used for the location or tracking of birds, animals, vehicles, people or other objects it is desirable to use as short and light an antenna as is possible. Normal ly a standard quarter wavelength of wire is regarded as the minimum length to give sufficient signal power. Unfortunately a quarter wavelength antenna, if not associated with an adequate ground plane, can have a loss of up to ten dB relative to one with a good ground plane. On an animal, bird or person a good ground plane is usually not possible.

In the sport of falconry, small, substantially single predetermined frequency transmitters are attached to hunting birds in order that they can be tracked and located if lost or out of sight. For this use it is particularly important that the transmitters are as small and light as possible but capable of a emitting as strong a signal as possible without a good ground plane.

The frequencies used for this sport are in the VHF band (>30 MHz) and are designated in each country in which it is practised. In the UK the legal frequency granted by the government is approximately 173 to 174 MHz. In USA, Canada, and Europe the frequency al loted for Falconry is approximately 216 MHz. In Germany frequencies of 151 to 155 MHz and 403 to 405 MHz are also used. In the Middle East frequencies in the range 215-220 MHz are used. The transmitters normally have a power less than 50 milliwatts, and are powered by batteries 1.5 to 6 volts nominal, preferably 3 to 4.5 volts nominal.

The transmitters presently in use have antennas made of spring steel wire which is quarter wavelength in length, that is approximately 33 cms for 216 MHz and 43.2 cms for 173 MHz. These antennas are extremely long compared with the overall dimensions of a bird and can get entangled in bushes, unbalance the bird or even cause it to be electricuted on high powered cables. It is thus highly desirable that the length of antenna be shortened for this use.

While the invention is mainly applicable to combined transmitters and antennas, it is also applicable to receivers and antennas, since it is sometimes useful for people to be able to carry light weight, small receivers which can be located in a pocket or the like and not easily visible. A combined receiver and transmitter can be connected to a common antenna. The term transmitter/receiver is intended to cover either on its own or both combined.

Prior Art

As stated above a straight wire quarter wavelength antenna is normally used.

A quarter wavelength of wire coiled into a helix has been used in some applications to reduce antenna length but the signal power compared with a straight wire is very much less and makes it unsuitable for use with low voltage transmitters.

A straight wire antenna with a coiled wire portion or inductance half way along it is also known. Although this effectively reduces antenna length it does not maintain radiated signal power in the absence of an adequate ground plane.

British Patent Specification No. 2046529 discloses an antenna having a coiled portion in series with a straight wire portion. This specification states that the straight wire portion has a length less than one quarter wavelength with the balance made up electrically by the coiled portion. However, the object of introducing the coiled portion is to compensate for the capacitive effects of the surroundings, particularly metal structures in a vehicle but not of the transmitter itself, and to allow the inductance to be varied after installation to cope with different surroundings. This Patent is not concerned with reducing the overall length of the antenna. They have only shortened the straight portion in order to be able to include a variable portion. The combined length of the coiled portion and the straight portion must be greater than one quarter wavelength, since only the part of the straight portion extending beyond its connection 24 to the coiled portion would have any radiating effect. The antenna is intended to be connected to a transmitter via a transmission line.

SUMMARY OF THE INVENTION

An object of the present invention is to produce an antenna combination with a transmitter/receiver, in which the antenna is either of comparable length with a quarter wavelength antenna and radiates significantly more power in the absence of a good ground plane than a conventional straight wire quarter wavelength antenna or is significantly shorter in length than a quarter wave length antenna but radiates equivalent or more power than the quarter wavelength antenna with no ground plane. The antenna and transmitter/receiver are preferably usable to provide a good signal with no or only a partial ground plane. However, the design with a short antenna should be usable with a good ground plane.

In one aspect the invention provides in combinaticn an antenna and a transmitter/receiver, the transmitter/receiver comprising a circuit designed to transmit and/or receive signals at a predetermined frequency and wavelength in the VHF band and having input/output terminal means and a casing at least part of which is conductive and in which the circuit is located, the antenna comprising a straight wire portion and a coiled wire portion in series, at least the majority of the coiled wire portion being exterior to the conductive portion of the casing, characterised in that, the combined length of the straight portion and the coiled portion is no more than a quarter of the predetermined wavelength, the end of the coiled wire portion is connected directly to the transmitter/receiver terminal means without the intermission of a transmission line, and the relative lengths of the coiled portion and the straight portion are selected to give a radiated output/received signal at said wavelength greater than the signal given by a straight wire antenna of length equal to said combined length.

We have found that the inclusion of a coiled wire portion of the correct inductance in addition to the straight wire portion gives a higher powered radiated output signal and this allows one to use a shortened design of antenna which makes the transmitter/receiver easier for a bird or animal to carry or easier to conceal, if used for covert operation on vehicles or people. With this configuration the casing itself contributes to the radiated output.

The coiled wire portion serves to increase the electrical length of the straight wire portion and of the transmitter casing (which itself acts as a radiator) so that in the absence of a ground plane, the antenna acts as an effective radiator of greater length than its real length. In addition the coiled wire portion itself acts as a section of helical antenna and adds electrical length.

Preferably the overall physical length of the antenna is between one half and two thirds of one quarter of the predetermined wavelength.

The tuning is normally done experimentally, using a radiation power detector, to determine the optimum coil to straight wire ratios of length to give the optimum inductance/electrical length for a particular transmitter and antenna combination thus giving maximum output.

When the transmitter/antenna combination has no ground plane present, the coil inductance can be arranged to tune out the capacitance of the transmitter case and straight wire antenna. As the combination is brought nearer to a ground plane the effective capacitances are changed reducing the effectiveness of the transmitter/antenna combination. We have found that in the sport of falconry the condition in which it is most important to have the strongest signal is that existing when the bird is on the ground or on a prey on the ground and in this condition, with a large mass near the transmitter, we have found that the effective capacitance of the transmitter/antenna combination is between 80 and 97 (preferably between 90 and 96) per cent of its capacitance with no ground plane present.

Accordingly, for this use, the combination of components is selected to give maximum output signal under these conditions. For this purpose it is necessary to simulate this condition and then experiment with the relative dimensions of the coiled portion and straight portion and the related inductance and helical antenna effects of the coiled portion to achieve a maximum signal.

The Transmitter is preferably arranged to transmit at 153 or 173 or 216 or 404 MHz (+or −3%) and has a battery power in the range 1.5 to 6 volts nominal and preferably 3 to 4.5 volts nominal. In the sport of falconry for example a falconer might have a set of one hundred transmitters each operating in the range 215-220 MHz and each fixed at a predetermined frequency which differs from the others in the sets by increments of 50 KHz. Each will transmit at its fixed frequency plus the tolerance of the crystal used in each transmitter which will be in the range 10-30 parts per million, which at 216 MHz is 2160-6480 Hertz. The signal from the transmitter is usually a pulsed carrier wave. Similarly a receiver would be fixed to receive at a fixed frequency and reduce this to produce an audiotone.

Particularly for use in falconry, the transmitter is preferably made as small and as light as possible for example less than 10 grams and preferably less than 7 grams including batteries. Preferably the transmitter is located on a printed board located in a casing from which the antenna extends; insulation is included between the antenna and the casing to form a seal and the overall dimensions of the transmitter casing are less than 35 mm length and 15 mm diameter, preferably less than 30 mm length and 7 mm diameter.

With advantage the coiled wire portion has a length in the range 5 to 15 mm, an internal coil diameter in the range 3 to 15 mm (preferably 3 to 4 mm) and is made of enamelled copper wire having a diameter in the range 0.3 to 2 mm, preferably substantially 0.56 mm. The coiled wire portion preferably has a reactance in the range 100 to 1000 ohms, preferably 800 to 1000 ohms and has a high Q so that at a frequency of for example 216 MHz the resistance of the coil is ideally less than 1% of the radiation resistance of the antenna. The radiation resistance of the combined antenna is in the range 10 to 30 ohms, which is less than conventional.

The straight wire portion, with advantage, has a length in the range one eighth to seven eighths of the predetermined wavelength, a diameter in the range 0.3 to 2 mm, preferably substantially 0.6 mm and may be made of copper or steel twisted or straight and insulated or not.

It is believed that the theory behind the improved radiation power achieved by the transmitter/receiver and antenna combination of the invention is as follows:

With a conventional antenna which is simply a length of wire a quarter wavelength long and in the absence of a good ground plane, the transmitter/receiver itself has the effect of being a short cylindrical antenna. The complete antenna therefore appears to be an asymmetrical dipole one half being a quarter wavelength and the other being a short cylindrical antenna. The impedance of a short cylindrical antenna is predominantly capacitive. The shorter the electrical length (90° being a quarter wavelength) the more capacitive the reactance and the smaller the resistance. The curves of this can be found in "Antenna Engineering Handbook—Jasik" published by McGraw Hill in 1961, chapter 3 FIGS. 3-1, 3—3, and 3-4. The effect is that the asymmetrical dipole, so formed, causes the impedance of the antenna to be significantly altered such that the radiation resistance of the antenna is made much smaller. In practice, the difference in radiated power from such a transmitter/antenna combination is of the order of −10 dB compared with the same unit when connected or associated with a good ground plane.

The effect of adding a coil, as in the present invention but retaining a full quarter wavelength antenna, is two fold namely:

1 the inductance coil is such that it tunes out the capacitive teacrance of the transmitter (which resembles a short antenna), 2 the coil, acting similar to a section of a normal-mode helix, causes the electrical length of the "transmitter half" of the dipole to be increased significantly.

The overall effect is that the input impedance of the asymmetrical dipole is now resistive and that both "halves" are of electrical length approaching a quarter wave. The radiated power in this arrangement is now significantly more than without the coiled wire section.

In the preferred form of the invention where the antenna wire is made shorter than quarter wavelength, the capacitive reactance increases and the resistance decreases. The inductive reactance of the coil is increased so as to tune out this capacitance. The coil can be considered to be in two sections. One section is tuning out the capacitance of the transmitter (which acts as a short antenna) and the other section is tuning out the capacitance of the shortened wire antenna. Similar to that effect previously described, each section of the coil also has a significant electrical length which increases the electrical length of each "half" of the effective dipole, thus increasing the resistance and therefore radiation.

The effect is such that the length of the overall antenna (coil plus antenna wire) can be shortened, compared with a quarter wavelength, whilst still maintaining an effective radiation power performance better than a quarter wavelength antenna operating in the absence of a good ground plane.

The resistance of the coil and wire antenna is related to the electrical lengths of both sides, i.e. the part coil plus casing and the part coil plus straight wire. This value varies from ten to thirty ohms and the antenna matching stage of the transmitter circuit is tuned to match this, which is considerably less than standard.

BRIEF DESCRIPTION OF THE DRAWINGS

One embodiment of combined transmitter/receiver and antenna with an alternative embodiment of antenna and with a transmitter circuit, in accordance with the invention, will now be described, by way of example only, with reference to the accompanying drawings of which.

DETAILED DESCRIPTION OF PREFERRED EMBODIMENTS

Figure 1:
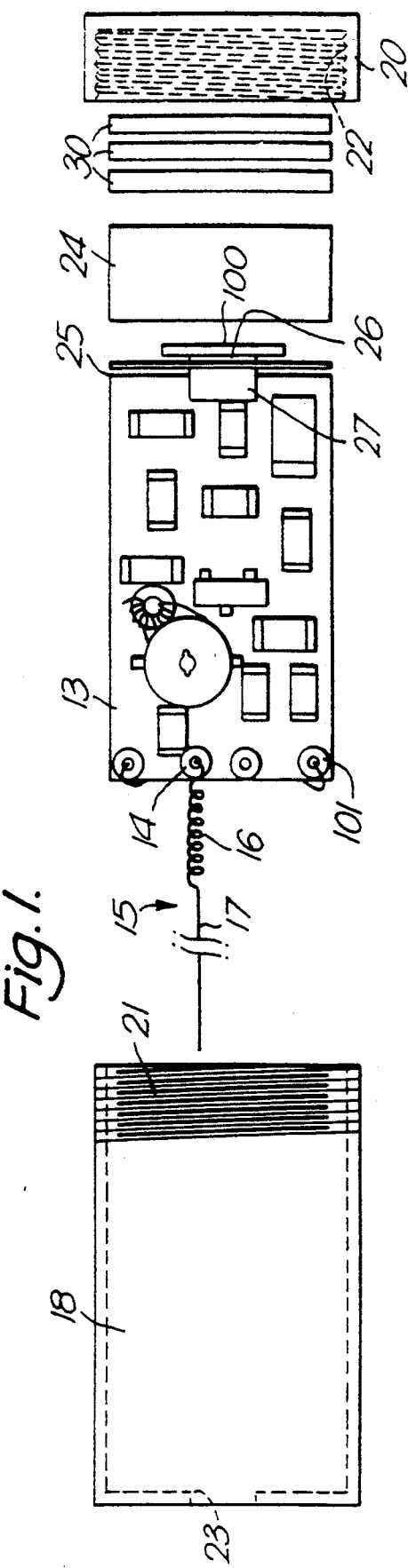
FIG. 1 is a exploded side view of the parts of a transmitter and antenna ready for assembly.
Figure 2:
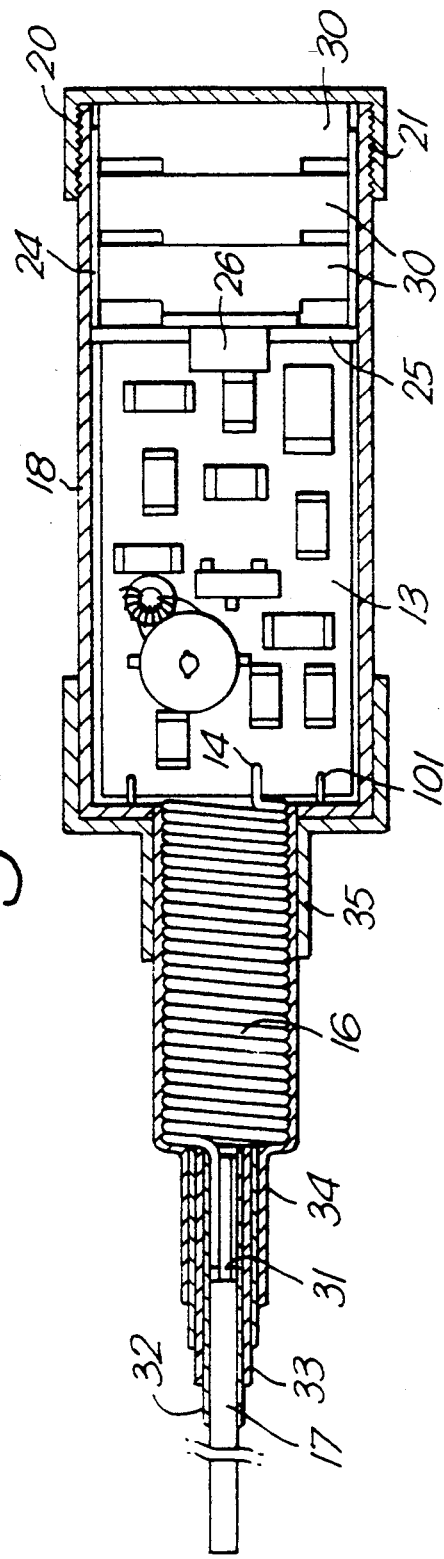
FIG. 2 is a sectional view of the parts assembled.
Figure 3:
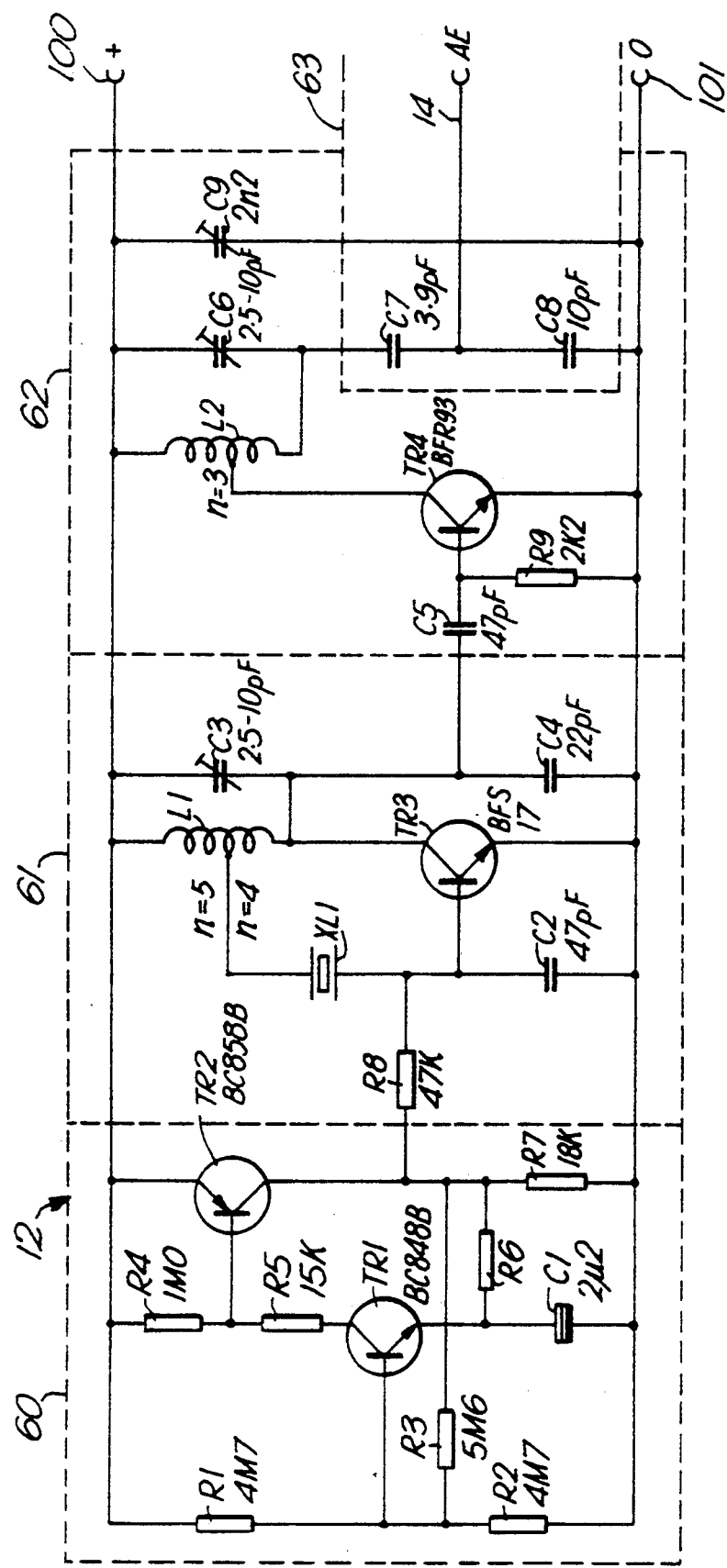
FIG. 3 is a circuit diagram of the transmitter.

In FIGS. 1 to 3, a transmitter circuit 12 is located on a printed circuit board 13 having an output terminal 14 to which an antenna 15 comprising a coiled wire portion 16 and a straight wire portion 17 is connected. The transmitter has a casing comprising an aluminium, conductive, cylindrical body 18 and a cap 20. The body is open at one end, the exterior surface of which is threaded at 21 and the cap is internally threaded at 22 to screw over the open end and form a seal. The base of the body 18 is formed with a central circular aperture 23 through which the antenna projects. The transmitter casing has a length dimension greater than its other dimensions, for example is of length 27 mm and external diameter 10 mm thus having a volume of less than 2500 cu mm. The antenna extends in the direction of the length of the casing. The transmitter has additionally an insulating sleeve 24, an insulating washer 25 and a battery connector 26 which comprises a stud 27 extending through the washer and defining a slot into which the end of the printed circuit board is pushed. Three batteries 30, each of 1.5 volts nominal, are located in the casing between the battery connector and the end of the cap and are surrounded by the insulating sleeve 24.

To assemble the transmitter, with one end of the coiled portion of the antenna connected directly to the output terminal of the printed circuit board 13, the circuit board is slid into the body 18 of the casing until it is fully against the base of the body. The insulating sleeve 24 is then slid against the washer 25 to cover the inside of the body for the length of the battery compartment. Five layers 31, 32, 33, 34, 35 of insulating heat shrink material are then placed over the antenna coiled portion 16 and the base of the body 18 starting with the smallest first, as seen in FIG. 2. These may include adhesive. The effect is that the coil is substantially rigid with the casing. The batteries are located in the battery compartment and the cap is screwed onto the casing body. The whole transmitter, casing and batteries, may be made to weigh as little as 7 grams. In this example (tuned for a ground plane) the transmitter had a frequency of 216.1 MHz, an output impedance of approx 22 ohms to match the radiation resistance and a capacitance of 1.5 pF. When configured for the condition of no ground plane the coiled wire portion had the following dimensions: 29 turns of enamalled copper wire 0.56 mm, 15 mm length, an internal dimension of 3.5 mm and an inductance of 700 nH. The straight wire was made of 7/0.2 mm standard steel cable, having a 185 mm length. The capacitance of the wire at this frequency is approximately 2.5 pF. The straight wire portion can be made from steel or copper or alloys of these and can be twisted or solid and insulated or not. The electrical length of the coiled wire portion was approx. 52° (Theoretical split 22° for the straight wire and 30° for the transmitter casing).

The transmitter circuit, as seen in FIG. 3, in this example is designed to transmit at 216.1 MHz which would normally involve a quarter wavelength antenna of 347 mm. The circuit has positive and negative terminals 100, 101 respectively at 4.5 volts nominal and zero voltage, the terminals being connected through the battery connector to the batteries 30.

The transistor circuit consists of four basic stages—a pulsing stage 60, a crystal oscillating stage 61, a frequency doubling and amplifying stage 62, and an antenna matching stage 63 and is more fully described in our copending application No. 07/590,265 of even date.

A transmitter and antenna as shown in the example but with various wire diameters, coil diameters, number of wound turns, coil length and straight wire antenna length were tested with no ground plane present as compared with a conventional quarter wave antenna both with a good ground plane and with no ground plane.

The following tables show the results.

TABLE 1

| A Straight Wire Antenna With a Good Ground Plane | | | |
|---|---|---|---|
| Total Antenna Length (wire) | E.R.P. (effective radiated power) dB | | |
| mm | + | − | |
| 347 | 0 | 0 | 0 Reference |
| 300 | | 2 | (quarterwave) |
| 260 | | 6 | |
| 200 | | 12 | |
| 180 | | 14 | |

TABLE 2

| A Quarter Wavelength Antenna With no Ground Plane Present | | |
|---|---|---|
| Total Antenna Length (wire) | E.R.P. dB | |
| mm | + | − |
| 347 | | 10 |

TABLE 3

Antenna according to the invention With No Ground Plane Present

| Total Antenna Length mm | E.R.P. dB + | E.R.P. dB − | COIL Wire Diameter mm | COIL Coil Diam mm | COIL Number of wound Turns | COIL Coil Length mm | Wire Diameter 0.71 mm Straight Wire Antenna Length mm |
| --- | --- | --- | --- | --- | --- | --- | --- |
| 348 | 3 |   | 0.4  | 3.43 | 16 | 8   | 340 |
| 275 | 0 | 0 | 0.56 | 3.59 | 24 | 15  | 260 |
| 224 | 0 | 0 | 0.4  | 3.47 | 34 | 24* | 200 |
| 222 |   | 2 | 0.4  | 3.43 | 25 | 12  | 200 |
| 200 |   | 2.5 | 0.56 | 3.59 | 30 | 18  | 182 |
| 200 |   | 3 | 0.4  | 3.43 | 34 | 20* | 180 |
| 180 |   | 4 | 0.56 | 3.59 | 34 | 20  | 160 |
| 95  |   | 10 | 0.4  | 3.43 | 34 | 15  | 80  |

* = Loosely wound coils

As shown the design in accordance with the invention, causes the radiated power to be dramatically increased over the existing designs of antenna and particularly allows a shortened antenna length which still out-performs the conventional quarter w. ave antenna with no ground plane. Because of the overiding desirability of small size and low weight when used for tracking birds or animals or in covert applications these criteria take predominance; in any case practical variations of size of coil diameter and wire diameter result in relativly small changes.

Antenna theory is particulary complicated because of the effects of the input conditions so that the final setting values of coil length compared with wire diameter length are best carried out experimentally for any particular application. This involves testing either with no ground plane or with the type of ground plane present for which the antenna/transmitter combination will be sold. That is for different uses, one has to simulate the conditions of use and then test experimentally to determine the best coil length and inductance.

As one example, while the transmitter/antenna combination given in the above example was tuned for use with no ground plane, a similar transmitter but designed for use with a good ground plane has an antenna with a coiled wire portion of wire diameter 0.56 mm, coil diameter 3.5 mm internal, number of turns 14, coil length 8 mm, and a straight wire portion of diameter 7/0.2 mm stranded wire and of length 185 mm so that the overall antenna length is 193 mm. The inductance of the coiled wire portion was approximately 220 nH.

In a further example of transmitter/antenna combination tuned for use on a falcon on the ground, the coiled wire portion had an inductance of 630 nH approx and comprised 26 turns of 0.56 mm wire, internal coil diameter 3.5 mm and length 15 mm. The straight wire portion of similar material as the above example had a length of 180 mm.

The output impedance of the transmitter is set to be approximately the same as that for matching to the impedance presented by the coil and wire antenna combination i.e. is of the order of 10–30 ohms (conventional 30–75 ohms). The resistance of the coil should be as small as possible compared with the radiation resistance of the antenna—$<10\%$ and preferably $<1\%$.

Figure 4:
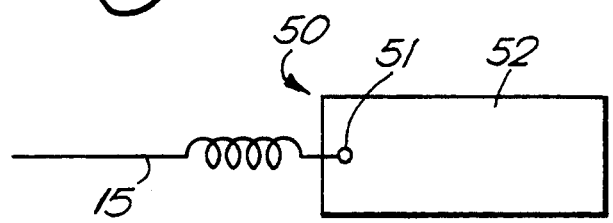
FIG. 4 is a diagrammatic view on a smaller scale of a receiver and antenna.

FIG. 4 shows a diagrammatic view of an assembled combination 50 in which an antenna 15 is connected directly to the input terminal 51 of a receiver circuit 52 or to the input/output terminal 51 of a combined receiving and transmitting circuit, to be located in a casing of the type shown in FIGS. 1 and 2.

Figure 5:
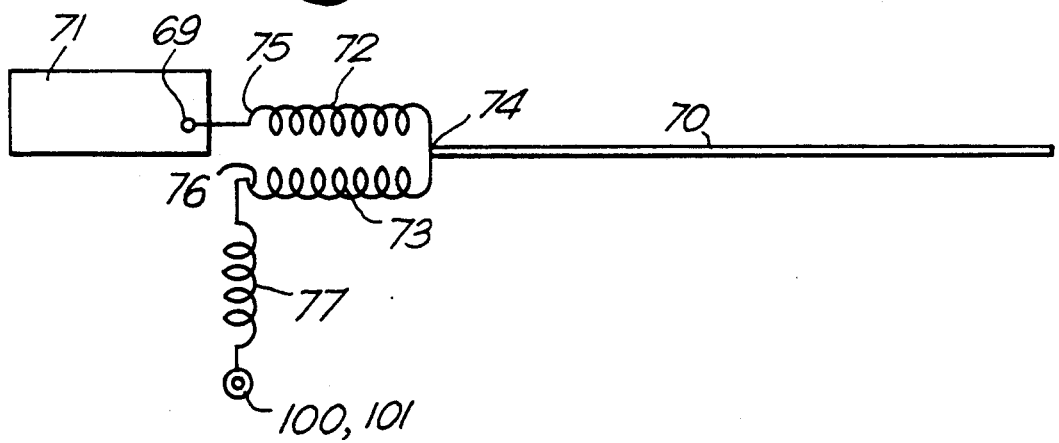
FIG. 5 is a diagrammatic view of an alternative form of antenna.

FIG. 5 shows a modified antenna which comprises a straight wire portion 70 and a double coiled wire portion 72, 73 one end 74 of each coiled portion being connected to the straight wire portion and the other end 75 of one coiled portion 72 being for connection to the output/input terminal 69 of a transmitter/receiver circuit 71. The other end 76 of the other coiled portion 73 is connected through a blocking inductor 77 which has an impedance greater than 50 ohms and preferably greater than 150 ohms to one of the terminals 100, 101 of a battery power supply. In one preferred form the coiled portion 72, 73 is manufactured out of 0.315 mm bifilar enamelled copper wire tightly wound to produce an air cored coil of about 5 mm outside diameter, unwound length 25.4 cms and wound length 1.5 cms. This used in combination with a 17.8 cms straight wire portion, giving an overall antenna length of 19.3 cms as compared with a quarterwave antenna of 33 cms at 216 MHz, still gave an increased output compared with the standard quarterwave straight wire antenna with no ground plane.

The coiled wire portion could be manufactured from any two wires closely coiled to give coupling or a coaxial cable could be used. As before the determination of the exact optimum relationships between the coiled portion and the straight wire portion are best determined experimentally for any particular use and transmitter.

What is claimed is:

1. In combination a single antenna and a transmitter/receiver, the transmitter/receiver comprising a circuit having terminal means designed to transmit and/or receive signals at a predetermined frequency and wavelength in the VHF band and having input/output terminal means and a casing at least part of which is conductive and in which the circuit is located, the casing having a length dimension greater than its dimensions in other directions, the antenna comprising a straight wire portion and a coiled wire portion connected in series and extending in the direction of the length dimension of the casing, at least a majority of the coiled wire portion being exterior to the conductive part of the casing, and in which the straight wire portion and the coiled portion having a combined length which is no more than a quarter of the predetermined wavelength, one end of the coiled wire portion is connected directly to the transmitter/receiver terminal means without the intermission of a transmission line and so as to be substantially rigid with the casing, the coiled portion and the straight wire portion having predetermined lengths to provide a radiated output/received signal at said wavelength greater than the signal given by a straight wire antenna of length equal to said combined length, and the coiled wire portion is a bifilar wire having two parts, an end of each part of which is connected to the straight wire portion, another end of one part of which is connected to the output terminal means of the transmitter and another end of the other part of which is connected to one of the transitter power supply terminals through a blocking inductance.

2. In combination a single antenna and a transmitter-receiver, the transmitter/receiver comprising a circuit having terminal means designed to transmit and/or receive signals at a predetermined frequency and wavelength in the VHF band and having input/output terminal means and a casing at least part of which is conductive and in which the circuit is located, the antenna comprising a straight wire portion and a coiled wire portion connected in series, at least a majority of the coiled wire portion being exterior to the conductive part of the casing, and in which the straight wire portion and the coiled portion have a combined length which is no more than a quarter of the predetermined wavelength, one end of the coiled wire portion is connected directly to the transmitter/receiver terminal means without the intermission of a transmission line, and the coiled portion and the straight wire portion having predetermined lengths to provide a radiated output/received signal at said wavelength greater than the signal given by a straight wire antenna of length equal to said combined length in which the coiled wire portion has an inductive reactance, the transmitter/receiver casing and the straight wire portion each have a capacitive reactance and the said reactances are selected to tune each other out so that the overall impedance of the combination is resistive.

3. A combination according to claim 2 in which the said combined length is between one half and two thirds of one quarter of the predetermined wavelength.

4. A combination according to claim 2 in which the transmitter/receiver transmits/receives at one of the frequencies selected from the group consisting of about 153, about 173, about 216, and about 404 MHz.

5. A combination according to claim 2 designed for use with battery power in the range 3 to 4.5 volts nominal.

6. A combination according to claim 2 in which the transmitter/receiver circuit is located on a printed board, insulation is included between the antenna and the casing to form a seal and a battery power supply is located in the casing, and in which the transmitter casing has a volume less than 2500 cu mm.

7. A combination according to claim 2 in which the length of the coiled wire portion is in the range 5 to 15 mms.

8. A combination according to claim 2 in which the coiled wire portion has an internal coil diameter in the range 3 to 15 mms.

9. A combination according to claim 2 in which the coiled portion is made of wire having a diameter 0.3 to 2 mms.

10. A combination according to claim 2 in which the coiled wire portion has a reactance in the range 100 to 1000 Ohms.

11. A combination according to claim 2 in which the straight wire portion has a length in the range 1/8th to 7/8ths of one quarter of the predetermined wavelength.

12. A combination according to claim 2 in which the straight wire portion has a diameter in the range 0.3 to 2 mms.

13. A combination according to claim 2 in which the coiled wire portion has an air core.

14. A combination according to claim 2 in which the coiled wire portion is a bifilar wire having two parts, an end of each part of which is connected to the straight wire portion, another end of one part of which is connected to the output terminal means of the transmitter and another end of the other part of which is connected to one of the transmitter power supply terminals through a blocking inductance.

15. A combination according to claim 1 or claim 2 in which said combined length is less than one quarter of the predetermined wavelength.

16. A combination according to claim 2 or claim 3 in which the inductive reactance of the coiled portion is selected for use of the combination with a partial ground plane, that is to give a maximum signal when the capacitive reactance of the transmitter is between 80 and 97% of its capacitive reactance with no ground plane.

17. A combination according to claim 1 or claim 2 including batteries having an output voltage of 3 to 4.5 volts nominal and in which the combined weight of the transmitter/receiver, batteries, casing and antenna is less than 10 grams.

18. A combination according to claim 1, 2 or 3 in which the receiver, antenna and casing together have a radiation resistance in the range 10 to 30 Ohms and the transmitter/receiver circuit has an output stage tuned to match this.

* * * * *